(12) United States Patent
Diao (10) Patent No.: US 10,263,503 B2
(45) Date of Patent: Apr. 16, 2019

(54) PERMANENT MAGNET SPEED GOVERNOR WITH FIXED MAGNETIC GAP

(71) Applicant: Junqi Diao, Jinan (CN)

(72) Inventor: Junqi Diao, Jinan (CN)

( * ) Notice: Subject to any disclaimer, the term of this patent is extended or adjusted under 35 U.S.C. 154(b) by 370 days.

(21) Appl. No.: 15/300,886

(22) PCT Filed: Oct. 15, 2014

(86) PCT No.: PCT/CN2014/088639
§ 371 (c)(1),
(2) Date: Sep. 30, 2016

(87) PCT Pub. No.: WO2015/154408
PCT Pub. Date: Oct. 15, 2015

(65) Prior Publication Data
US 2017/0025941 A1    Jan. 26, 2017

(30) Foreign Application Priority Data
Apr. 11, 2014    (CN) .................... 2014 2 0174225 U (51) Int. Cl.
*H02K 51/00* (2006.01)
*H02K 1/27* (2006.01)
(Continued)

(52) U.S. Cl.
CPC .............. *H02K 51/00* (2013.01); *H02K 1/27* (2013.01); *H02K 1/28* (2013.01); *H02K 49/043* (2013.01); *H02K 49/046* (2013.01); *H02K 21/028* (2013.01)

(58) Field of Classification Search
USPC ................................ 310/105–110
See application file for complete search history.

(56) References Cited

U.S. PATENT DOCUMENTS 2,913,605 A * 11/1959 Johnson ................ F16D 63/002
310/105
4,152,617 A * 5/1979 Janson .................... H02K 49/00
310/103
(Continued)

FOREIGN PATENT DOCUMENTS

CN          2197347 Y     5/1995
CN        201395465 Y    2/2010
(Continued)

OTHER PUBLICATIONS

Jan. 6, 2015 Search Report issued in International Patent Application No. PCT/CN2014/088639.

*Primary Examiner* — Alexander Talpalatski
(74) *Attorney, Agent, or Firm* — Oliff PLC (57) ABSTRACT

A permanent magnet speed governor with fixed magnetic gap, including a barrel-shaped conductor rotor and a permanent magnet rotor therein, wherein the permanent magnet rotor includes a driven shaft and at least one rotatable permanent magnet circumferentially arranged around the driven shaft, the rotatable permanent magnet is cylindrical and has N and S poles in the diameter direction, magnetic conductors are wrapped at the two sides of the rotatable permanent magnet, the two magnetic conductors are separated by a non-magnetic conductor, the rotatable permanent magnet is connected to the driven shaft by the magnetic conductor at one side, and a magnetic circuit regulator is arranged at one end of the rotatable permanent magnet. Since a fixed magnetic gap structure is adopted, the engagement area of the speed governor is increased, and the assembling difficulty is reduced, thereby reducing waste of rare earth materials and increasing torque transmission capability.

9 Claims, 5 Drawing Sheets

(51) Int. Cl.
*H02K 1/28* (2006.01)
*H02K 49/04* (2006.01)
H02K 21/02 (2006.01)

(56) References Cited

U.S. PATENT DOCUMENTS

| | | | | | |
|---|---|---|---|---|---|
| 4,612,469 | A | * | 9/1986 | Muramatsu | H02K 49/046 310/105 |
| 5,154,623 | A | * | 10/1992 | Kuwahara | H02K 49/043 188/164 |
| 2018/0138795 | A1 | * | 5/2018 | Imanishi | H02K 49/043 |

FOREIGN PATENT DOCUMENTS

| | | |
|---|---|---|
| CN | 101710780 A | 5/2010 |
| CN | 103414313 A | 11/2013 |
| CN | 103904863 A | 7/2014 |
| CN | 203775006 U | 8/2014 |
| EP | 0224660 A1 | 6/1987 |
| EP | 1843454 A1 | 10/2007 |

\* cited by examiner

PERMANENT MAGNET SPEED GOVERNOR WITH FIXED MAGNETIC GAP

TECHNICAL FIELD

The invention relates to a permanent magnet speed governor, specifically a permanent magnet speed governor with fixed magnetic gap.

BACKGROUND TECHNOLOGY

Permanent magnet speed governors realize speed regulation through the magnetic coupling of permanent magnet and realize the flexible (magnetic) connection of motors and loads, without any harmonic waves affecting power grid, with high reliability, and they can work in various severe environments such as high temperature, low temperature, humid environment, dirty environment, inflammable and explosive environment, unsteady voltage and thunder, greatly reducing mechanical vibration; they are widely used in power, iron and steel, metallurgy, petrochemical, papermaking, municipal engineering, ship, irrigation and mining industries. However, the existing commonly-used permanent magnet speed governors realize speed regulation through the adjustment of air gap, and the power consumption of magnetic circuit regulator is large, and there are shortcomings such as poor torque transmission capability, high difficulty in assembling and a waste of lots of rare earth resources.

Content of Invention

As for the aforesaid problems, the present invention provides a permanent magnet speed governor with a fixed magnetic gap which can reduce the power consumption of magnetic circuit regulator, improve the torque transmission capability, reduces the difficulty in assembling and save rare earth resources.

The existing permanent magnet speed governors controls the degree that the conductor rotor cuts the magnetic line of force and thus realize the adjustment of torque through changes in the air gap between the conductor rotor and permanent magnetic rotor, and that method has many shortcomings. Based on the principle of electromagnetic field, the present invention designs a new permanent magnet speed governor from the perspective of keeping the magnetic gap unchanged and changing the number of magnetic line of force, and, by reference to the characteristics of magnetic materials and non-magnetic materials, it controls the magnetic intensity of permanent magnet externally displayed by use of such two kinds of materials and thus realizes the goal of changing the torque.

In order to solve the aforesaid problems, the present invention adopts the following technical solutions: a permanent magnet speed governor with a fixed magnetic gap, comprising a barrel-shaped conductor rotor and a permanent magnet rotor therein, wherein the permanent magnet rotor comprises a driven shaft and at least one rotatable permanent magnet circumferentially arranged around the driven shaft, the rotatable permanent magnet is cylindrical and has an N pole and an S pole in the diameter direction, magnetic conductors are wrapped at the two sides of the rotatable permanent magnet, the two magnetic conductors are separated by a non-magnetic conductor, the rotatable permanent magnet is connected to the driven shaft by the magnetic conductor at one side, and a magnetic circuit regulator is arranged at one end of the rotatable permanent magnet, the said magnetic circuit regulator is used to rotate the rotatable permanent magnet, regulate its magnetic pole direction and thus change the magnetic intensity of magnetic conductors at both sides. The setting of non-magnetic conductor hinders the development of short circuit formed by magnetic line of force inside the magnetic conductor, thus causing the magnetic conductor to show no magnetism externally no matter how rotate the rotatable permanent magnet. When the conductor rotor rotates, it will form relative movement with the permanent magnetic rotor, and the permanent magnetic field will produce eddy currents in the conductor rotor; meanwhile, eddy currents will produce an induced magnetic field to interact with the permanent magnetic field, finally driving the permanent magnetic rotor to rotate in the same direction as that of conductor rotor and thus driving the driven shaft which is connected to the permanent magnetic rotor to rotate and output power. The power output is in direct proportion to the magnetic intensity (intensity of magnetic line of force) of permanent magnetic rotor, and the magnetic intensity of permanent magnetic rotor is controlled by the magnetic circuit regulator, so it is possible to change the magnetism displayed externally by magnetic conductor through the control over the rotation of rotatable permanent magnet by the magnetic circuit regulator, and thus lead to the variation in the speed of the conductor rotor and the driven shaft and finally realize the objective of speed regulation. The specific adjustment process is as follows: the rotatable permanent magnet is rotated through the magnetic circuit regulator, and when the connection surface of N pole and S Pole of rotatable permanent magnet is perpendicular to (the included angle of 90°) the contact surface of magnetic conductor and non-magnetic conductor, the magnetic line of force is separated by the non-magnetic conductor and passes through the air, and the magnetic conductor is magnetized to the strong magnet of the corresponding magnetic pole; on the contrary, when the connection surface of N pole and S Pole of rotatable permanent magnet is parallel to (the included angle of 0°) the contact surface of magnetic conductor and non-magnetic conductor, the magnetic line of force successfully passes through the magnetic conductor, and the magnetic conductor displays no magnetism externally; according to different rotation angle of rotatable permanent magnet, affected by the change of magnetic circuit, the magnetism displayed externally by the magnetic conductor changes from the weakest to the strongest (or from the strongest to the weakest). In comparison with the change in the axial distance of the conductor rotor and the permanent magnetic rotor, this method reduces the power consumption of magnetic circuit regulator and improves the torque transmission capability.

There are many installation directions for the rotatable permanent magnet, as long as they can ensure that when the conductor rotor rotates, it can cut the magnetic line of force, preferably the said rotatable permanent magnet is perpendicular to the driven shaft. The rotatable permanent magnet is circumferentially arranged around the driven shaft.

In order to improve the magnetism displayed externally by the permanent magnetic rotor and increase the adjustment scope of magnetism, every rotatable permanent magnet is equipped with a fixed permanent magnet side by side along the axial direction of the driven shaft, the fixed permanent magnet is cylindrical and has an N pole and an S pole in the diameter direction, the magnetic conductor and the non-magnetic conductor around the rotatable permanent magnet extend to the surrounding of the fixed permanent magnet, and an N pole and an S pole of the fixed permanent magnet are respectively arranged in two separated magnetic conductors and the connection surface of those two poles is perpendicular to the contact surface of the magnetic conductor and the non-magnetic conductor. The specific adjustment process is as follows: the rotatable permanent magnet can be rotated through the magnetic circuit regulator, and when the same poles of the fixed permanent magnet and the rotatable permanent magnet are in the same direction, the corresponding magnetic conductor will be magnetized to the strong magnet of the corresponding magnetic pole, and the magnetism is the strongest, being the sum of all magnetisms of two magnets; when the same poles of the fixed permanent magnet and the rotatable permanent magnet are in the opposite direction, the magnetic line of force successfully passes through the corresponding magnetic conductor, and the magnetic conductor does not display magnetism externally; when the magnetic pole of rotatable permanent magnet rotates to the extent of being parallel to the contact surface of the magnetic conductor and the non-magnetic conductor, the magnetic line of force of rotatable permanent magnet passes through the magnetic conductor and displays no magnetism externally, and there is only the magnetism of fixed permanent magnet; according to different rotation angle of rotatable permanent magnet, the magnetism displayed externally by the magnetic conductor changes from the strongest to the weakest (or from the weakest to the strongest).

Another preferable arrangement method of rotatable permanent magnet is as follows: the said rotatable permanent magnet is parallel to the driven shaft. The rotatable permanent magnet is circumferentially arranged around the driven shaft.

Similarly, in order to improve the magnetism displayed externally by the permanent magnetic rotor and increase the adjustment scope of magnetism, every rotatable permanent magnet is equipped with a fixed permanent magnet side by side along the radial direction of the driven shaft, and the magnetic conductor and the non-magnetic conductor around the rotatable permanent magnet extend to the surrounding of the fixed permanent magnet, and an N pole and an S pole of the fixed permanent magnet are respectively arranged in two separated magnetic conductors and the connection surface of those two poles is perpendicular to the contact surface of the magnetic conductor and the non-magnetic conductor. The specific adjustment process is the same as above.

The said magnetic circuit regulator comprises a regulating actuator used for receiving control signals and a mechanical transmission mechanism connecting the regulating actuator and the rotatable permanent magnet. During the use process, the permanent magnet speed governor is installed in a control system, and the pressure, flow, liquid level or other control signals are received and processed by the control system and are provided to the regulating actuator, and the regulating actuator rotates the rotatable permanent magnet through the mechanical transmission mechanism, changing the magnetic intensity, adjusting the rotating speed of loads and meeting the control requirements. The mechanical transmission mechanism is used to transmit the control act sent out by the regulating actuator to the rotatable permanent magnet, controlling the rotation of permanent magnet, and there are many realization methods, such as servo motor, lever transmission mechanism, gear transmission mechanism, gear-rack transmission mechanism and guide wire transmission mechanism. Several best feasible transmission mechanisms are described as follows:

The said mechanical transmission mechanism is a lever transmission mechanism, comprising a transmission sleeve, which is sheathed on the driven shaft and is in key connection with the driven shaft, and rotary rod correspondingly arranged for every rotatable permanent magnet, wherein one end of the transmission sleeve is provided with a limiting groove at one end, and one end of rotary rod is in fixed connection with the end of rotatable permanent magnet, while the other end of rotary rod is stuck in the limiting groove via the limiting shaft to connect the transmission sleeve, and the other end of transmission sleeve is connected with the regulating actuator through the bearing sheathed on the driven shaft.

The said mechanical transmission mechanism is a gear transmission mechanism, comprising a gear barrel sheathed on outside the driven shaft and a rotary gear which is in mesh connection with the periphery of gear barrel, wherein the rotary gear and the rotatable permanent magnet are one-to-one correspondence, and the shaft of rotary gear is connected with the end of rotatable permanent magnet, and the gear barrel is connected with the regulating actuator.

The said mechanical transmission mechanism is a gear-rack transmission mechanism, comprising a rack barrel connected with the regulating actuator, a rack inside the rack barrel and a rotary gear which is meshed with the rack, wherein the shaft of rotary gear is connected with the end of rotatable permanent magnet.

Since a fixed magnetic gap structure is adopted in the invention, the engagement area of the speed governor is increased, and the assembling difficulty is reduced, thereby reducing the waste of rare earth materials and increasing the torque transmission capability. Since it adopts the magnetic circuit adjustment structure, the power consumption of a mechanism for executing adjustment is greatly reduced and the entire volume of the speed governor is reduced to the maximum extent, not only lowering consumption of materials and saving installation space, but convenience is brought to the site installation construction at the same time.

1. Conductor rotor, 2. Magnetic conductor, 3. Fixed permanent magnet, 4. Rotatable permanent magnet, 5. Rotary rod, 6. Transmission sleeve, 7. Driven shaft, 8. Regulating actuator, 9. Bearing, 10. Non-magnetic conductor, 11. Limiting groove, 12. Limiting shaft, 13. Rack barrel, 14. Rotary gear, 15. Rack, 16. Gear barrel

SPECIFIC EMBODIMENTS

Embodiment 1

Figure 1:
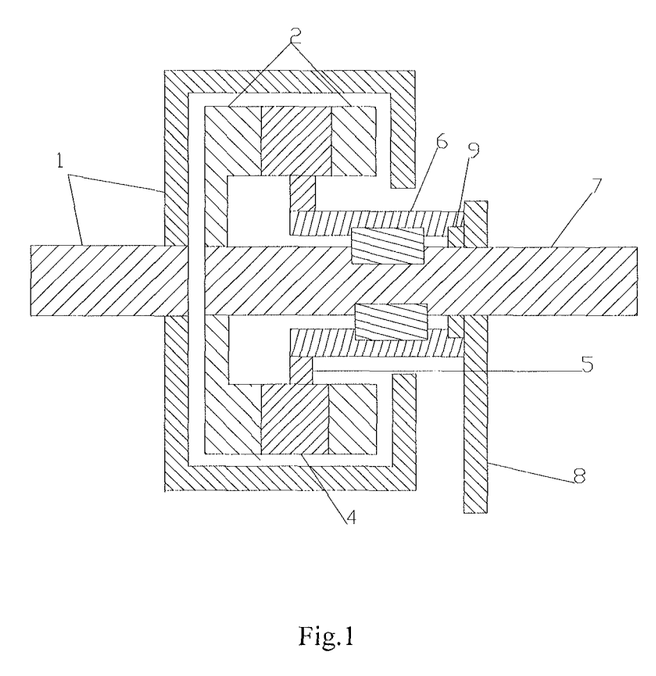
FIG. 1 is the front section view of Embodiment 1.
Figure 2:
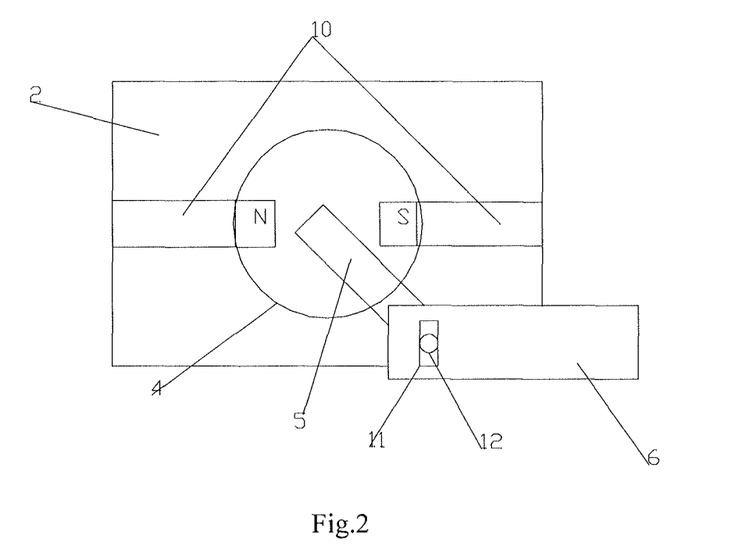
FIG. 2 is the schematic diagram of magnetic pole face of Embodiment 1.

A permanent magnet speed governor with a fixed magnetic gap, as shown in FIG. 1 and FIG. 2, comprising a barrel-shaped conductor rotor 1 and a permanent magnet rotor therein, characterized in that wherein the permanent magnet rotor comprises a driven shaft 7 and at least one rotatable permanent magnet 4 circumferentially arranged around the driven shaft 7, the rotatable permanent magnet 4 is cylindrical and has an N pole and an S pole in the diameter direction, the said rotatable permanent magnet 4 is perpendicular to the driven shaft 7. magnetic conductors 2 are wrapped at the two sides of the rotatable permanent magnet 4, the two magnetic conductors 2 are separated by a non-magnetic conductor 10, the rotatable permanent magnet 4 is connected to the driven shaft 7 by the magnetic conductor 2 at one side, and a magnetic circuit regulator is arranged at one end of the rotatable permanent magnet 4, the said magnetic circuit regulator is used to rotate the rotatable permanent magnet 4, regulate its magnetic pole direction and thus change the magnetic intensity of magnetic conductors 2 at both sides. The the said magnetic circuit regulator comprises a regulating actuator 8 used for receiving control signals and a mechanical transmission mechanism connecting the regulating actuator 8 and the rotatable permanent magnet 4. said mechanical transmission mechanism is a lever transmission mechanism, comprising a transmission sleeve 6, which is sheathed on the driven shaft 7 and is in key connection with the driven shaft 7, and rotary rod 5 correspondingly arranged for every rotatable permanent magnet 4, wherein one end of the transmission sleeve 6 is provided with a limiting groove 11 at one end, and one end of rotary rod 5 is in fixed connection with the end of rotatable permanent magnet 4, while the other end of rotary rod 5 is stuck in the limiting groove 11 via the limiting shaft 12 to connect the transmission sleeve 6, and the other end of transmission sleeve 6 is connected with the regulating actuator 8 through the bearing 9 sheathed on the driven shaft 7.

Embodiment 2

Figure 3:
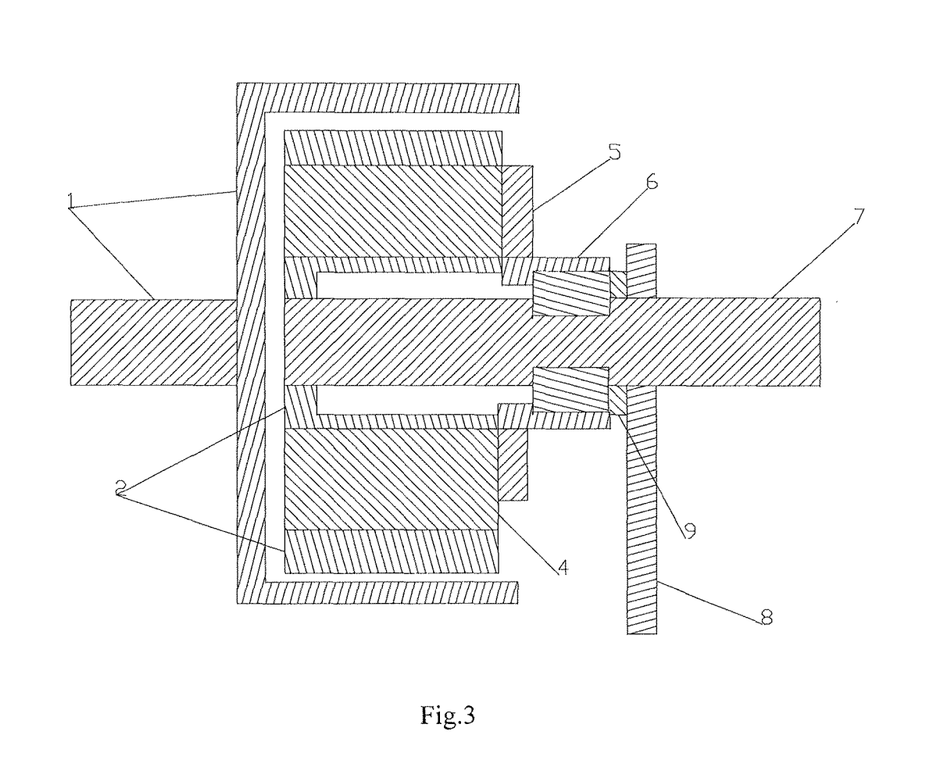
FIG. 3 is the front section view of Embodiment 2.
Figure 4:
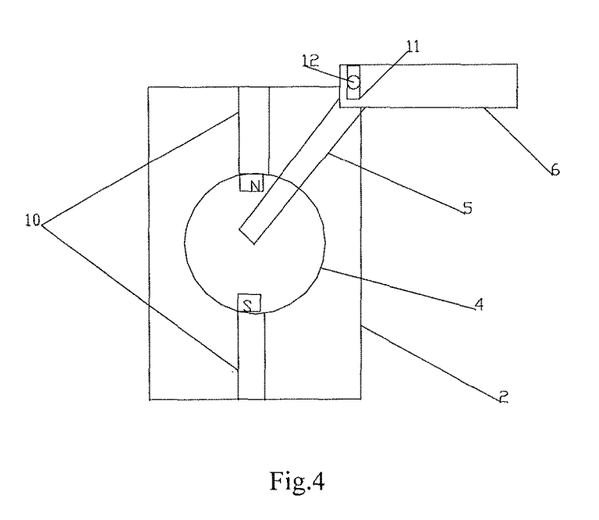
FIG. 4 is the schematic diagram of magnetic pole face of Embodiment 2.

A permanent magnet speed governor with a fixed magnetic gap, as shown in FIG. 3 and FIG. 4, wherein the said rotatable permanent magnet 4 is parallel to the driven shaft 7, while other structures are the same as those of Embodiment 1.

Embodiment 3

Figure 5:
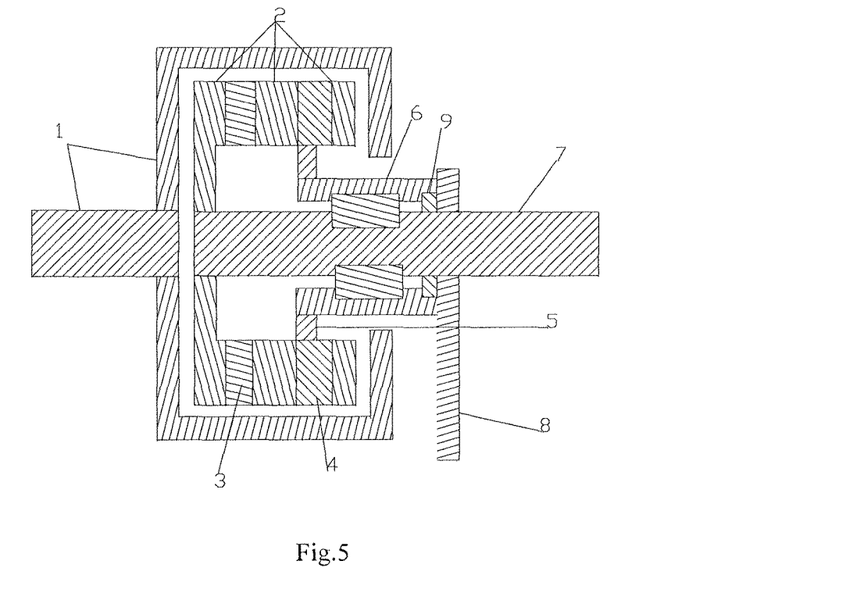
FIG. 5 is the front section view of Embodiment 3.
Figure 6:
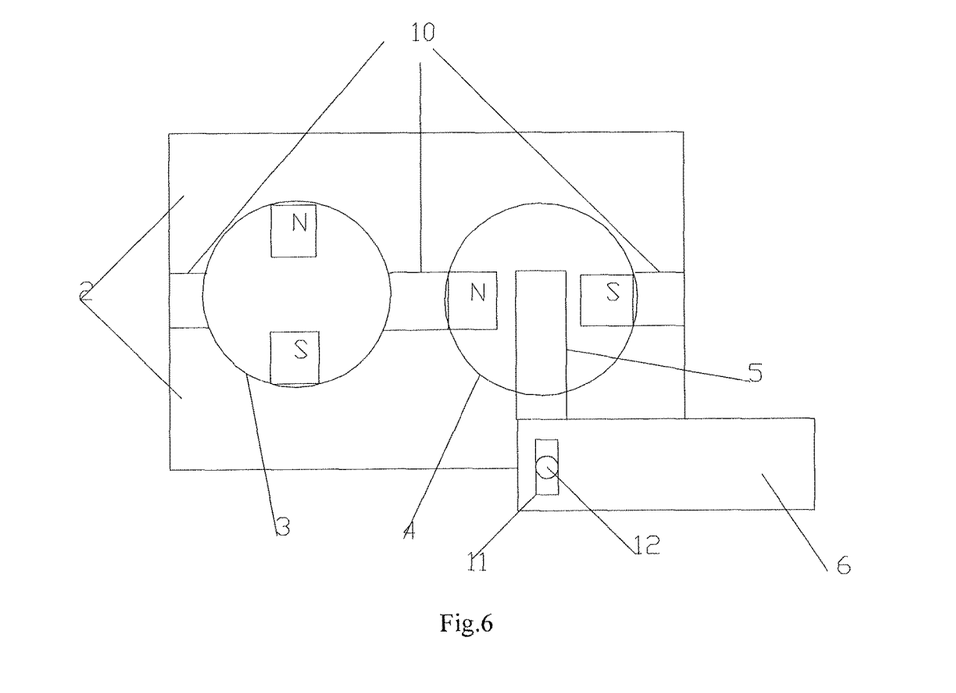
FIG. 6 is the schematic diagram of magnetic pole face of Embodiment 3.

A permanent magnet speed governor with a fixed magnetic gap, as shown in FIG. 5 and FIG. 6, comprising a barrel-shaped conductor rotor 1 and a permanent magnet rotor therein, characterized in that wherein the permanent magnet rotor comprises a driven shaft 7 and at least one rotatable permanent magnet 4 circumferentially arranged around the driven shaft 7, the rotatable permanent magnet 4 is cylindrical and has an N pole and an S pole in the diameter direction, the said rotatable permanent magnet 4 is perpendicular to the driven shaft 7. magnetic conductors 2 are wrapped at the two sides of the rotatable permanent magnet 4, the two magnetic conductors 2 are separated by a non-magnetic conductor 10, the rotatable permanent magnet 4 is connected to the driven shaft 7 by the magnetic conductor 2 at one side, and a magnetic circuit regulator is arranged at one end of the rotatable permanent magnet 4, the said magnetic circuit regulator is used to rotate the rotatable permanent magnet 4, regulate its magnetic pole direction and thus change the magnetic intensity of magnetic conductors 2 at both sides. every rotatable permanent magnet 4 is equipped with a fixed permanent magnet 3 side by side along the axial direction of the driven shaft 7, the magnetic conductor 2 and the non-magnetic conductor 10 around the rotatable permanent magnet 4 extend to the surrounding of the fixed permanent magnet 3, and an N pole and an S pole of the fixed permanent magnet are respectively arranged in two separated magnetic conductors and the connection surface of those two poles is perpendicular to the contact surface of the magnetic conductor and the non-magnetic conductor. The the said magnetic circuit regulator comprises a regulating actuator 8 used for receiving control signals and a mechanical transmission mechanism connecting the regulating actuator 8 and the rotatable permanent magnet 4. said mechanical transmission mechanism is a lever transmission mechanism, comprising a transmission sleeve 6, which is sheathed on the driven shaft 7 and is in key connection with the driven shaft 7, and rotary rod 5 correspondingly arranged for every rotatable permanent magnet 4, wherein one end of the transmission sleeve 6 is provided with a limiting groove 11 at one end, and one end of rotary rod 5 is in fixed connection with the end of rotatable permanent magnet 4, while the other end of rotary rod 5 is stuck in the limiting groove 11 via the limiting shaft 12 to connect the transmission sleeve 6, and the other end of transmission sleeve 6 is connected with the regulating actuator 8 through the bearing 9 sheathed on the driven shaft 7.

Embodiment 4

Figure 7:
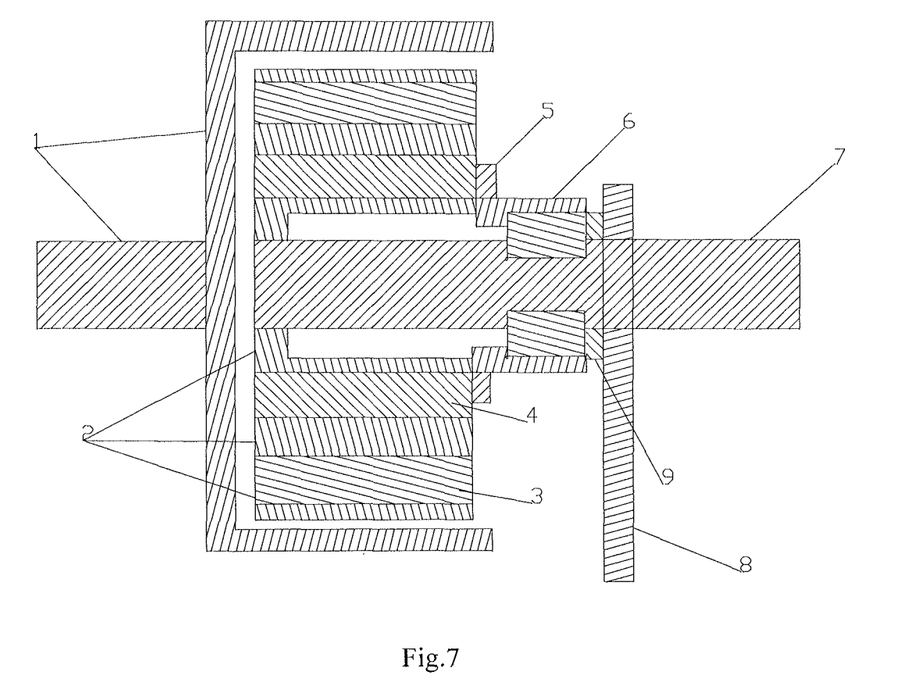
FIG. 7 is the front section view of Embodiment 4.
Figure 8:
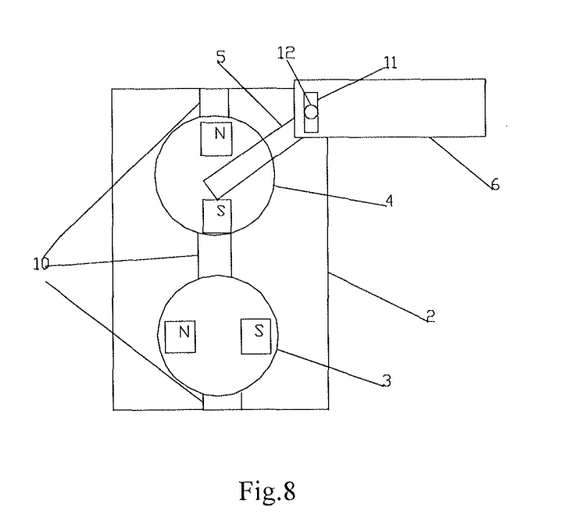
FIG. 8 is the schematic diagram of magnetic pole face of Embodiment 4.

A permanent magnet speed governor with a fixed magnetic gap, as shown in FIG. 7 and FIG. 8, wherein the said rotatable permanent magnet 4 is parallel to the driven shaft 7, and every rotatable permanent magnet 4 is equipped with a fixed permanent magnet 3 side by side along the radial direction of the driven shaft 7, while other structures are the same as those of Embodiment 3.

Embodiment 5

Figure 9:
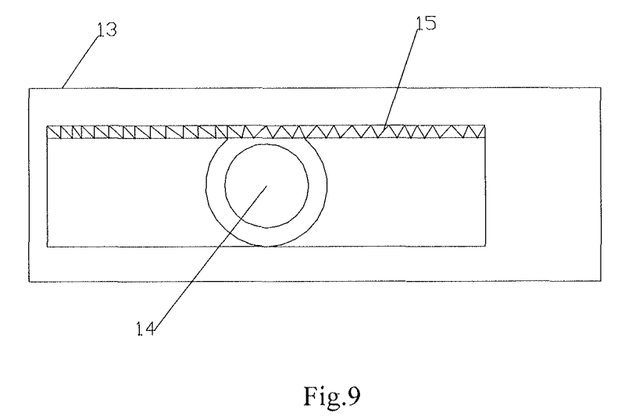
FIG. 9 is the schematic diagram of gear-rack transmission structure.

A permanent magnet speed governor with a fixed magnetic gap, as shown in FIG. 9, wherein the said mechanical transmission mechanism is a gear-rack transmission mechanism, comprising a rack barrel 13 connected with the regulating actuator 8, a rack 15 inside the rack barrel 13 and a rotary gear 14 which is meshed with the rack 15, wherein the shaft of rotary gear 14 is connected with the end of rotatable permanent magnet 4. Other structures are the same as those of Embodiment 3.

Embodiment 6

Figure 10:
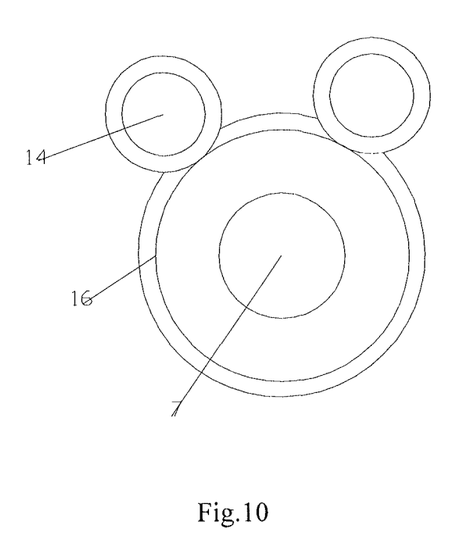
FIG. 10 is the schematic diagram of gear transmission structure.

A permanent magnet speed governor with a fixed magnetic gap, as shown in FIG. 10, wherein the said mechanical transmission mechanism is a gear transmission mechanism, comprising a gear barrel 16 sheathed on outside the driven shaft 7 and a rotary gear 14 which is in mesh connection with the periphery of gear barrel 16, wherein the rotary gear 14 and the rotatable permanent magnet 4 are one-to-one correspondence, and the shaft of rotary gear 14 is connected with the end of rotatable permanent magnet 4, and the gear barrel 16 is connected with the regulating actuator 8. Other structures are the same as those of Embodiment 4.

The present invention can adopt the structure comprising fixed permanent magnets and rotatable permanent magnets in pairs, or the structure comprising rotatable permanent magnets only, and it is not limited to the said Embodiments. Any invention adopting the same thought is under the protection scope of the present invention.

The invention claimed is:

1. A permanent magnet speed governor with a fixed magnetic gap, comprising a barrel-shaped conductor rotor and a permanent magnet rotor therein, wherein the permanent magnet rotor comprises a driven shaft and at least one rotatable permanent magnet circumferentially arranged around the driven shaft, the rotatable permanent magnet is cylindrical and has an N pole and an S pole in the diameter direction, magnetic conductors are wrapped at the two sides of the rotatable permanent magnet, the two magnetic conductors are separated by a non-magnetic conductor, the rotatable permanent magnet is connected to the driven shaft by the magnetic conductor at one side, and a magnetic circuit regulator is arranged at one end of the rotatable permanent magnet, the said magnetic circuit regulator is used to rotate the rotatable permanent magnet, regulate its magnetic pole direction and thus change the magnetic intensity of magnetic conductors at both sides.

2. The permanent magnet speed governor with a fixed magnetic gap according to claim 1, wherein the said rotatable permanent magnet is perpendicular to the driven shaft.

3. The permanent magnet speed governor with a fixed magnetic gap according to claim 2, wherein every rotatable permanent magnet is equipped with a fixed permanent magnet side by side along the axial direction of the driven shaft, the fixed permanent magnet is cylindrical and has an N pole and an S pole in the diameter direction, the magnetic conductor and the non-magnetic conductor around the rotatable permanent magnet extend to the surrounding of the fixed permanent magnet, and an N pole and an S pole of the fixed permanent magnet are respectively arranged in two separated magnetic conductors and the connection surface of those two poles is perpendicular to the contact surface of the magnetic conductor and the non-magnetic conductor.

4. The permanent magnet speed governor with a fixed magnetic gap according to claim 1, wherein the said rotatable permanent magnet is parallel to the driven shaft.

5. The permanent magnet speed governor with a fixed magnetic gap according to claim 4, wherein every rotatable permanent magnet is equipped with a fixed permanent magnet side by side along the radial direction of the driven shaft, the fixed permanent magnet is cylindrical and has an N pole and an S pole in the diameter direction, the magnetic conductor and the non-magnetic conductor around the rotatable permanent magnet extend to the surrounding of the fixed permanent magnet, and an N pole and an S pole of the fixed permanent magnet are respectively arranged in two separated magnetic conductors and the connection surface of those two poles is perpendicular to the contact surface of the magnetic conductor and the non-magnetic conductor.

6. The permanent magnet speed governor with a fixed magnetic gap according to claim 1, wherein the said magnetic circuit regulator comprises a regulating actuator used for receiving control signals and a mechanical transmission mechanism connecting the regulating actuator and the rotatable permanent magnet.

7. The permanent magnet speed governor with a fixed magnetic gap according to claim 6, wherein the said mechanical transmission mechanism is a lever transmission mechanism, comprising a transmission sleeve, which is sheathed on the driven shaft and is in key connection with the driven shaft, and rotary rod correspondingly arranged for every rotatable permanent magnet, wherein one end of the transmission sleeve is provided with a limiting groove at one end, and one end of rotary rod is in fixed connection with the end of rotatable permanent magnet, while the other end of rotary rod is stuck in the limiting groove via the limiting shaft to connect the transmission sleeve, and the other end of transmission sleeve is connected with the regulating actuator through the bearing sheathed on the driven shaft.

8. The permanent magnet speed governor with a fixed magnetic gap according to claim 6, wherein the said mechanical transmission mechanism is a gear transmission mechanism, comprising a gear barrel sheathed on outside the driven shaft and a rotary gear which is in mesh connection with the periphery of gear barrel, wherein the rotary gear and the rotatable permanent magnet are one-to-one correspondence, and the shaft of rotary gear is connected with the end of rotatable permanent magnet, and the gear barrel is connected with the regulating actuator.

9. The permanent magnet speed governor with a fixed magnetic gap according to claim 6, wherein the said mechanical transmission mechanism is a gear-rack transmission mechanism, comprising a rack barrel connected with the regulating actuator, a rack inside the rack barrel and a rotary gear which is meshed with the rack, wherein the shaft of rotary gear is connected with the end of rotatable permanent magnet.

* * * * *